United States Patent [19]

Galbraith

[11] Patent Number: 5,168,386
[45] Date of Patent: Dec. 1, 1992

[54] FLAT FIELD TELECENTRIC SCANNER

[75] Inventor: Lee K. Galbraith, Mountain View, Calif.

[73] Assignee: Tencor Instruments, Mountain View, Calif.

[21] Appl. No.: 602,201

[22] Filed: Oct. 22, 1990

[51] Int. Cl.⁵ .............................................. G02B 26/08
[52] U.S. Cl. ..................... 359/215; 359/208; 359/212
[58] Field of Search ............... 350/6.1, 6.7, 6.8–6.91; 359/201–226, 196–198, 205–221, 726–732, 662–664, 864–869

[56] References Cited

U.S. PATENT DOCUMENTS

| | | | |
|---|---|---|---|
| 3,360,654 | 12/1967 | Muller | 250/221 |
| 3,809,891 | 5/1974 | Erdman et al. | 250/222.1 |
| 3,927,940 | 12/1975 | Kitahara et al. | 350/6.91 |
| 4,017,732 | 4/1977 | Runciman | 250/334 |
| 4,196,961 | 4/1980 | Walter et al. | 359/208 |
| 4,226,500 | 10/1980 | Minoura et al. | 359/196 |
| 4,690,485 | 9/1987 | Plaot | 350/6.9 |
| 4,756,585 | 7/1988 | Kaneko et al. | 350/6.8 |
| 4,848,864 | 7/1989 | Ostertag et al. | 350/6.8 |
| 4,852,957 | 8/1989 | Wakimoto et al. | 359/208 |
| 4,863,250 | 9/1989 | Ishikuza | 350/463 |
| 4,880,299 | 11/1989 | Hamada | 350/415 |
| 4,941,719 | 7/1990 | Hisada et al. | 350/6.8 |

Primary Examiner—Bruce Y. Arnold
Assistant Examiner—Thong Nguyen
Attorney, Agent, or Firm—Schneck & McHugh

[57] ABSTRACT

Flat-field telecentric scan systems, each having a planar scanning reflector situated in a light path and mounted for movement about a scan axis, a concave spherical mirror fixed in a position in the light path an effective focal length away from the scanning reflector to provide a telecentric scan of the light beam, and a lens or mirror with spherical surfaces placed in the light path for providing a flat-field scan. The concave mirror and the additional lens or mirror element may be placed off of the symmetry axis to avoid light obstruction problems provided the tilt of the scanning reflector and the positions and orientations of the concave mirror and additional optical element are selected for a straight-line scan. The additional lens can be either before or after the concave mirror in the light path. It can also be positioned in the path of both light incident on and reflected from the concave mirrors. The lens and concave mirror can be integrally formed by providing a reflective coating on one lens surface. In several embodiments, astigmatism and coma can also be eliminated or minimized.

13 Claims, 2 Drawing Sheets

FLAT FIELD TELECENTRIC SCANNER

DESCRIPTION

1. Technical Field

The present invention relates to optical systems for scanning or deflecting a light beam, and in particular to beam scanners of the type which use a periodically moving reflective element, such as an oscillating mirror.

2. Background Art

Wafer defect scanners, laser printers, document scanner and the like make use of a narrow collimated laser beam that is scanned across a flat surface along a straight line path. A typical optical scanning system for this purpose employs a rotating or oscillating flat mirror to deflect the beam. The collimated input beam is aimed perpendicular to the scanning mirror's rotational axis, so that the chief deflected ray sweeps a plane in space. The beam thus strikes the flat surface in a spot that scans along a straight line path. Beam collimation generally ensures that the spot size remains substantially the same at both the center and edges of the flat surface. In order to ensure that the spot moves across the surface at a uniform rate, the deflected beam passes through an f·Θ lens system before reaching the target surface. Then the beam spot sweeps equal distances on the surface for equal angular deflections of the scanning mirror.

The design of f·Θ lens systems is straightforward, and many compact, relatively inexpensive systems are commercially available. However, these compact f·Θ lenses are not telecentric; that is, the chief ray of the scanning beam is not normal to the flat image plane being scanned after passing through the lens system. Accordingly, the beam spot changes shape slightly from circular at the center of the flat target surface to elliptical at the edges and corners of the flat target surface. Telecentric f·Θ lens systems are available. Two such systems are described in U.S. Pat. Nos. 4,863,250 and 4,880,299. Unfortunately, telecentric f·Θ lens systems are more complex, with multiple lens elements, are much bigger, bulkier and heavier and are more expensive than the non-telecentric variety. This is principally because the final lens element in a telecentric system must be larger than the length of the scan path. A typical telecentric lens system designed to scan across a 200 mm path would weigh about 10 kg and cost several thousand dollars. Accordingly, most laser printers do not use telecentric scanning, despite the potential improvement in image quality.

It is an object of the present invention to provide a simple, low-cost, flat-field telecentric laser-spot scan system.

DISCLOSURE OF THE INVENTION

The above object has been met with a scan system for a laser beam comprising a planar scanning reflector mounted for rotation or oscillation about a scan axis, a concave spherical mirror fixed in a position an effective focal length away from the scanning reflector for providing a telecentric scan, and an additional optical element with only spherical optical surfaces for correcting field curvature to provide a flat-field scan. The additional optical element may be a positive meniscus lens placed in a position in series before or after the concave mirror or both. The concave mirror and lens element can be integrally combined to form a reflectively coated lens. The additional optical element may also be a second spherical mirror.

In operation, a light beam is incident on the planar scanning reflector, is reflected thereby and sweeps a surface in space. The reflected light beam is reflected by the concave mirror in a telecentric manner toward an image plane containing a flat target surface. The light beam is prefocused to image at a point beyond the concave mirror, and the additional optical element corrects the light path so that the focused light spot lies substantially in the image plane for each scan position. To prevent obscuration problems associated with the case of a concave mirror, instead of previous lens systems, the concave mirror and additional optical element are preferably positioned off of the symmetry axis defined by their centers of curvature and the point of incidence of the chief ray on the scan mirror. In this off-axis configuration, the scan mirror is tilted with respect to the incident light beam so that the reflected beam describes a shallow cone in space. Well known computer ray-tracing programs may be used to specify the best scan mirror tilt, the radii of curvature of the corrective optical element and the spacing and orientations of the concave mirror and corrective optical element to provide a straight scan path, as well as an astigmatism-free image and minimum coma.

BEST MODE FOR CARRYING OUT THE INVENTION

Figure 1:
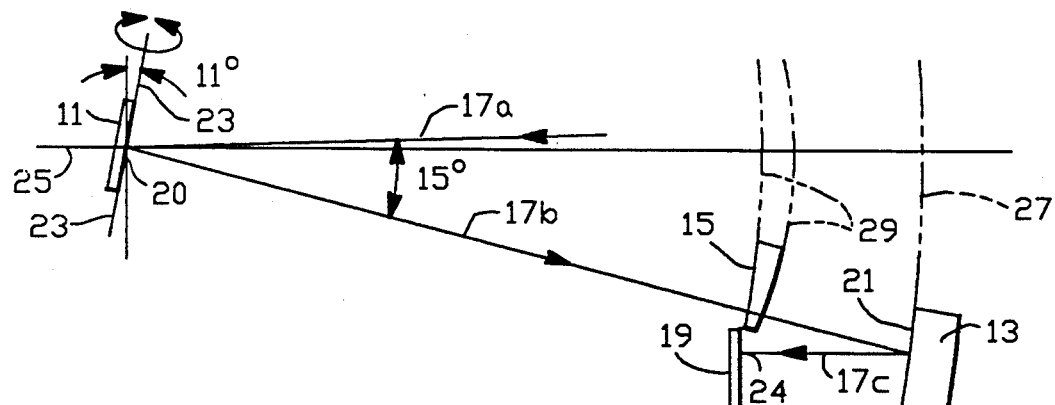
FIG. 1 is a side schematic view of a first flat-field telecentric scanner embodiment in accord with the present invention having a lens-before-mirror arrangement.

With reference to FIG. 1, an optical scanner system embodiment in accord with the present invention includes a planar scanning reflector 11, a fixed concave mirror 13 and an additional optical element, in this case a lens 15 between reflector 11 and mirror 13, arranged serially in the path of a light beam 17a–c for directing the beam in a scanning motion over a target surface 19. The "beam" is made up of a bundle of light rays which, since the beam is focussed, converge to a geometrical point. The drawings show only the chief ray at the center of the beam's ray bundle. The planar reflector 11 is disposed so that the chief ray of the light beam 17a is incident on reflector 11 at a point 20, and so that the beam is deflected by reflector 11 toward concave mirror 13. Reflector 11 is movable about a scan axis 23 so as to cause the reflected light beam 17b to describe a conical or planar surface in space.

The concave mirror 13 is fixed in position intercepting the light beam 17b and redirecting the light, as beam portion 17c, toward target surface 19. Mirror 13 has a spherical reflective surface 21 which is characterized by a radius of curvature. A mirror radius of curvature of about one meter is typical. In order to obtain telecentric scanning of the target surface 19, the spacing between the point of intersection 20 of the chief ray of the light beam 17a with the planar scan mirror 11 and the system's primary principal plane should equal the effective focal length of the optical system. The optical system includes all of the optical elements 11, 13, 15 in the light path 17a, 17b and 17c leading to the target surface 19. Since the concave mirror 13 in this system is relatively strong and the correction element beam lens 15, is relatively weak, the primary principal plane of the system is near the concave mirror 13. Thus, the concave mirror 13 should be spaced from the planar scanning reflector 11 by a distance along the scanning beam 17b which is approximately equal to the effective focal length of the concave mirror 13 in combination with any intervening optical element 15 in the path of light beam 17b. This focal length is approximately one-half the radius of curvature of the reflective surface 21, or typically about 500 mm. The distance is only approximate because (1) the surface 21 of concave mirror 13 is spherical rather than parabolic, (2) the distance of one-half the radius of curvature means that the edges of the concave mirror 13 are slightly further from light incidence point 20 on planar scanned reflector 11 than the center of mirror 13, and (3) the intervening positive lens 15 in FIG. 1 slightly alters the path of light beam 17b, thereby slightly shortening the effective focal length of the mirror-lens combination 13 and 15. Further, for telecentric scanning the concave mirror 13 should be at least as large as the scan path on the target surface is long, i.e. typically about 200 mm long. Typically, the scan deviates from perfect telecentricity by a few milliradians.

The additional optical element, namely lens 15, is a positive meniscus lens with spherical surfaces placed in the path of light beam 17b between the planar scanning reflector 11 and the concave mirror 13. Lens 15 is a correction lens that adjusts the light path slightly so that the beam 17c reflected from concave mirror 13 is not only telecentric, but also flat field, i.e. images in a plane coinciding with the target surface 19. The incident light beam 17a is preferably prefocused to image in a small diameter spot 24 on the target surface 19 beyond concave mirror 13. However, because the distance covered by the light 17b and 17c from the scanning reflector 11 to the target surface 19 will vary slightly according to the position of the scan, lens 15 is added to effectively correct the path length of the light so that a focused spot 24 images in a plane corresponding to the target surface regardless of the scan position. 20 μm is a typical focused spot size that can be maintained in a flat field scan over a scan length of about 200 mm. The distance of the lens 15 from the concave mirror 13 and the radii of curvature of the spherical surfaces of lens 15 can be mutually adjusted relative to one another to not only eliminate field curvature to obtain a planar image field for the focused light spot 24, but also to achieve an astigmatism-free spot image and, to some extent, reduce third order coma. Use of computer programs to effect such adjustments is well known in the field of optics.

Because the use of a concave mirror element results in the incident and reflected light beams to be on the same side of the concave mirror, as opposed to an f·θ lens element of the prior art where incident and refracted light beams are on opposite sides of the lens, obscuration of the light by the target surface is potentially a problem. In FIG. 1, the concave mirror 13 is positioned off-axis so the light beam 17b reflected from the scanning mirror 11 reaches the concave mirror 13 without obstruction by the target surface 19 and then continues on to the target surface 19. The symmetry axis 25 is defined by a line passing through the point 20 of incidence of the chief ray of beam 17a on scanning reflector 11 and through the center point of the sphere 27 of which the concave mirror surface 21 of mirror 13 is a part. The spheres 29 which make up the surfaces of the meniscus lens 15 preferably have their centers on the symmetry axis also. The actual optical elements 13 and 15 themselves do not lie on the symmetry axis in the "off-axis" configuration shown in FIG. 1. The planar scanning reflector 11 is tilted away from perpendicular relative to the chief ray of the incident light beam 17a and tilted away from the perpendicular to the symmetry axis so that the reflected beam 17b continues off-axis to the lens 15 and concave mirror 13 and then to the image plane 19 without obstruction. If the beam 17b leaving the scanning reflector 11 described a plane in space, as it does in a f·θ lens system, then the final focused spot 24 would follow a curved scan line in the off-axis configuration of FIG. 1. However, the scan path on the target surface 19 can be straightened out by combining the proper tilt of the scanning reflector 11 with the proper orientation of the lens and mirror elements 13 and 15 so that the light 17b reflected from the scanning mirror 11 describes the surface of a cone in space typically about 15° from the incident light beam 17a. The beam 17c reflected by the concave mirror 13 then describes an almost planar surface, preferably parallel to the symmetry axis, that intercepts the image plane or target surface 19 in a nearly straight line scan path with only very small ripple terms. Typically, the resulting scan deviates by only one or two micrometers from a straight line path over a 200 mm scan length.

Figure 2:
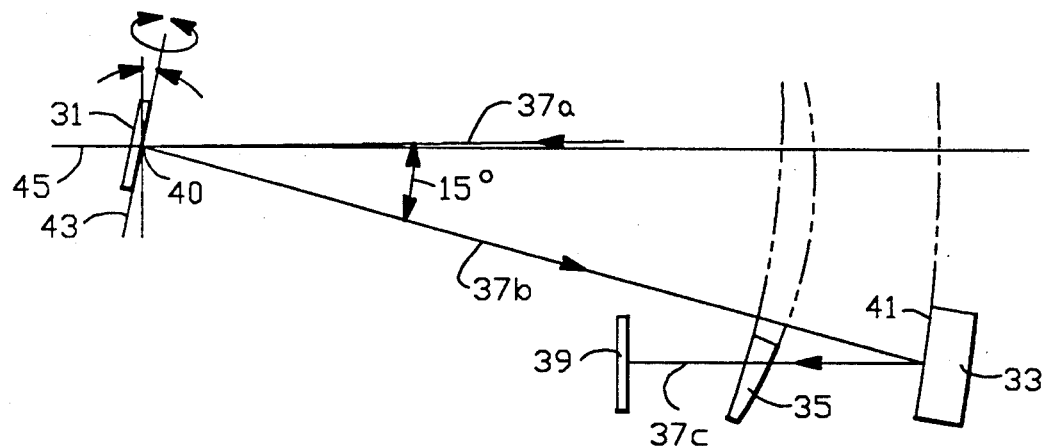
FIG. 2 is a side schematic view of a second flat-field telecentric scanner embodiment in accord with the present invention having a lens-after-mirror arrangement.

With reference to FIG. 2, another embodiment of the invention places the lens element 35 in the path of the light beam 37c after it is reflected from the concave mirror 33. As in the first embodiment in FIG. 1, the embodiment in FIG. 2 includes a planar scanning reflector disposed in the path of an incident light beam 37a and movable about an axis 43 to cause the reflected light 37b to describe a shallow cone surface in space about 15° from the incident beam 37a. The embodiment also includes a concave mirror 33 having a spherical reflective surface fixed in a position to reflect the scanner deflected light beam 37b. The spherical surface 41 has a radius of curvature which is approximately twice the distance between the scanning mirror 31 and the concave mirror 33 so as to provide telecentric scanning of a target surface 39. The light beam 37a–c is prefocused so that the final spot focusses in a plane at the target surface 39. The lens element 35 is a positive meniscus lens disposed in the light path 37c between the concave mirror 33 and the target surface 39 for correcting any field curvature of the image of the focused beam 37c, and thereby to provide a flat-field scan with a substantially constant spot size. Use of computer software to select a lens shape that preserves telecentricity while making the scan field flat and astigmatism free for any given lens position is known. It is discovered that the lens after mirror embodiment of FIG. 2 has the remarkable property that if the lens 35 is positioned so as to be approximately halfway between the concave mirror 33 and the image plane 39 and the lens shape selected for a flat field, then coma can also be made to vanish completely. The mirror 33 to image 39 distance is typically about 85 mm for a one meter radius concave mirror.

Figure 3:
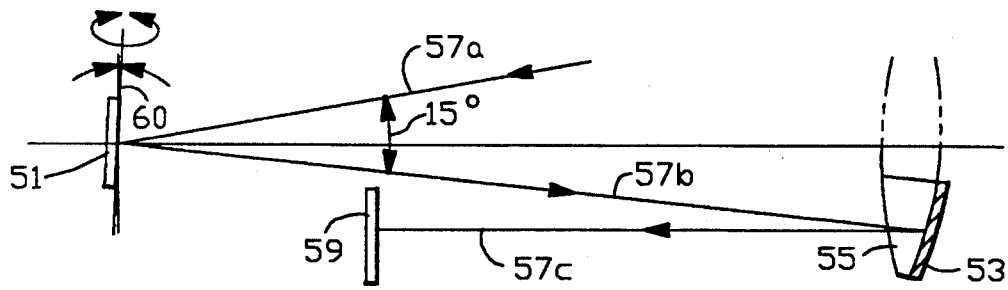
FIG. 3 is a side schematic view of a third flat-field telecentric scanner embodiment in accord with the present invention having a reflectively coated lens arrangement.

With reference to FIG. 3, the simplest embodiment to construct combines the concave mirror 13 or 33 of FIGS. 1 or 2 with a lens element into a single composite element, namely a lens 55 with a reflective coating 53 on one surface. The configuration is also easiest to align. A planar scanning mirror 51 reflects an incident light beam 57a along a path 57b that sweeps a plane or a shallow surface of a cone in space about 15° from incident light path 57a as mirror 51 rotates or oscillates about a scan axis 60. Lens 55 is a biconvex lens with spherical surfaces and the reflective mirror coating 53 on the surface of the lens 55 which is furthest from scanning mirror 51. Mirror coating 53 thus forms a concave mirror, functionally like mirrors 13 and 33 in FIGS. 1 and 2. The lens-mirror coating combination is spaced a focal length away from scanning mirror 51 for telecentric scanning of a target surface in the image plane 59 by light beam 57c. The lens 55 is nearly symmetrical in astigmatism-free systems, but if the lens 55 is made perfectly symmetrical to lower cost of production the residual astigmatism is still sufficiently low for good performance. The beam quality is best in this configuration when the image plane 59 is separated from the reflective lens surface coating 53 by about 80% of the effective focal length, rather than being close to the mirror (less than 100 mm distant) as in the FIGS. 1 and 2 embodiments. Typically, the mirror to image distance is about 400 mm. The large separation makes this embodiment useful in bare wafer scanning systems, where the effects of light scattered by the optics become less detrimental the further the scanning optical elements 53 and 55 are from the wafer surface.

Figure 4:
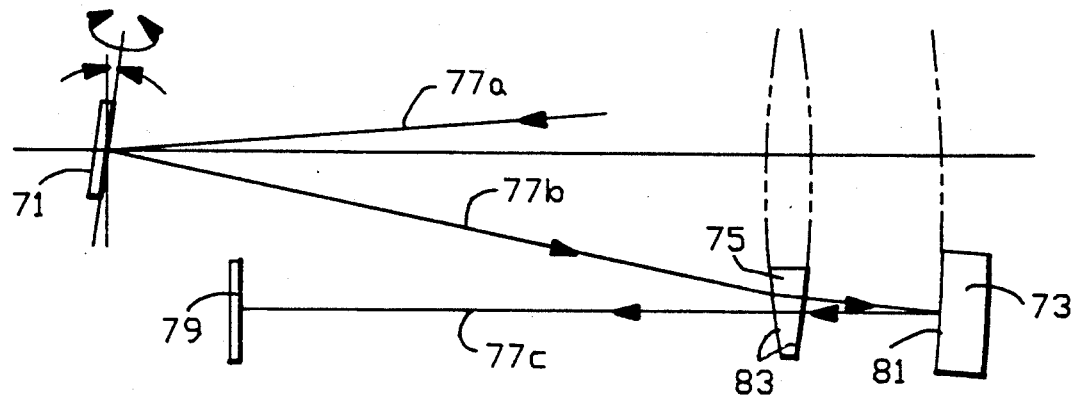
FIG. 4 is a side schematic view of a fourth flat-field telecentric scanner embodiment in accord with the present invention having a two-pass lens arrangement.

With reference to FIG. 4, a fourth embodiment uses two distinct and spaced apart lens and mirror elements 75 and 73, as in FIGS. 1 and 2, but the light path 77a-c traverses the lens 75 twice, as in FIG. 3, going both to and from the concave mirror 73. Lens 75 is a biconvex lens with spherical surfaces and is typically spaced a distance of about 100 mm from concave mirror 73. Concave mirror 73 has a spherical reflective surface 81 with a radius of curvature which is typically about 2 meters. Concave mirror 73 is spaced from the planar scanning mirror 71 by a distance which is equal to the effective focal length of the combined lens 75 and mirror system. This distance is approximately one-half of the radius of curvature of the concave mirror 73, or about one meter, corrected by the lens focal length, to a distance of about 625 mm. The lens 75 may be selected for a coma-free system, like FIG. 2, in addition to the flat field and astigmatism-free requirements of previous embodiments. In the coma-free case, the system focal length is about 625 mm, the mirror-to-image plane distance is about 400 mm and the lens-to-image plane distance is about 300 mm. A potential disadvantage of the FIG. 4 embodiment is that the light beam 77a-c effectively crosses five surfaces between planar scanner 71 and image plane 79 and so the system is prone to lens reflections and scattering. Nevertheless, the large 300 mm distance between the final lens surface 83 and the image plane in the coma-free solution means that it can be used without any substantial problems in a bare wafer scanner.

Figure 5:
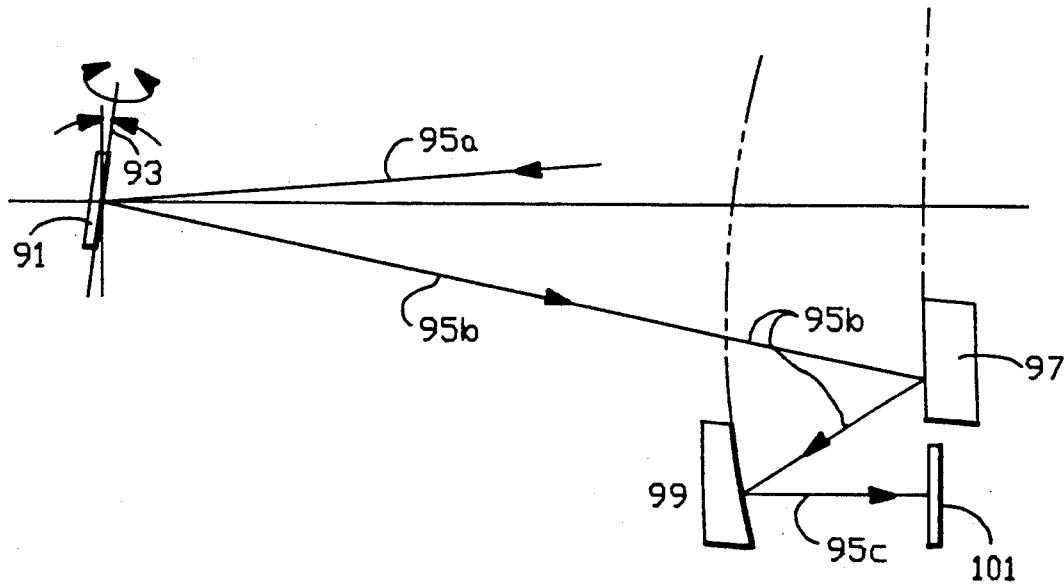
FIG. 5 is a side schematic view of a fifth flat-field telecentric scanner embodiment in accord with the present invention having a two-mirror lens arrangement.

With reference to FIG. 5, a fifth embodiment of a scanning system in accord with the present invention includes a planar scanning reflector 91 movable about a scan axis 93 and placed in the path of an incident light beam 95a. Two off-axis mirrors 97 and 99 in series in the path of the scanning light beam 95b reflected from scan reflector 91 produce a telecentric scan of the light beam 95c incident on a target surface in an image plane 101. For telecentric scanning concave mirror 99 should be spaced a distance along the light path of the scanning light beam 95b from planar scan mirror 91 by an amount approximately equal to the effective focal length of the two mirror system 97 and 99. Since mirror 97 is a weak convex mirror, this distance is approximately one-half of the radius of curvature of the spherical surface of concave mirror 99, or about 500 mm. The incident light beam 95a is prefocused to image at a spot beyond concave mirror 99. The convex mirror 97 is an additional optical element in the light path 95b between planar scan mirror 91 and concave mirror 99 that corrects the light path 95b slightly so as to provide a flat field of focus in image plane 101. Accordingly, the spot size of the light beam 95c on a target surface placed in image plane 101 does not substantially change size as the beam scans the target surface. Both coma and astigmatism are undercorrected, but can be made reasonably low by making the mirror-to-mirror separation and the distance between the concave mirror 99 and image plane 101 as small as possible. In a system with an effective focal length of about 500 mm, the mirror separation and image plane distance are each preferably 50 mm or less. However, there are not enough degrees of freedom in the two mirror embodiment in FIG. 5 to produce a flat-field telecentric scanner that is also completely astigmatism free. Coma is very low and can be made negligible.

The above-described embodiments are capable, with a system effective focal length of 500 mm, of telecentric flat-field scanning over a scan distance on the target surface of 200 mm and with a substantially constant $1/e^2$ spot diameter of about 20 $\mu$m. Similar embodiments can be devised to scan other scan distances telecentrically and with other spot sizes in a flat field. The embodiments are substantially astigmatism free with the exception of that shown in FIG. 5. The FIGS. 2 and 4 embodiments can be made free of coma, and in the FIG. 5 embodiment coma can be made negligible. All of the curved optical surface are spherical for ease of manufacture and low cost. The FIGS. 3 and 4 embodiments, with their large last optical element to image plane distances, are especially suitable in bare wafer scanners. All of the embodiments shown and described are preferably built with off-axis optical elements to avoid obscuration problems, yet the offset distance from the symmetry axis to the scan line on the target surface is kept to not more than about 150 mm, and scan curvature is straightened out to a line with essentially negligible non-straightness, i.e. with peak-to-peak deviations of the scan from a line of less than 10% of spot size.

I claim:

1. An optical system for scanning a light beam comprising:

a planar reflector disposed in a path of a focussed light beam for deflecting said light beam incident thereon, said planar reflector being movable about a scan axis;

a concave mirror having a spherical reflective surface fixed in a position in the path of said deflected light beam, said spherical reflective surface characterized by a radius of curvature, said concave mirror being spaced from said planar reflector by a distance which is approximately equal to an effective focal length of said concave mirror; and a lens positioned in both the light path between said concave mirror and said reflector and in the path of light reflected by said concave mirror, said lens having at least one spherical optical surface, whereby said lens corrects the path of said deflected light beam such that said light beam scans a target plane with a substantially flat field of focus.

2. The system of claim 1 wherein said lens is integrally formed with said concave mirror, said lens having a reflective coating on a rear surface to form said concave mirror.

3. The system of claim 1 wherein said lens is spaced apart from said concave mirror.

4. An optical system for scanning a light beam comprising:

a planar reflector disposed in a path of a focussed light beam for deflecting said light beam incident thereon, said planar reflector being movable about a scan axis;

a concave mirror having a spherical reflective surface fixed in a position in the path of said deflected light beam, said spherical reflective surface characterized by a radius of curvature, said concave mirror being spaced from said planar reflector by a distance which is approximately equal to a focal length of said concave mirror, wherein a symmetry axis is defined through a point of incidence of the chief ray of said light beam on said planar reflector and through a center of curvature of said spherical reflective surface of said concave mirror, said concave mirror being positioned off of said symmetry axis, said planar reflector being tilted with respect to said incident light beam and tilted away from perpendicular to said symmetry axis so as to deflect said light beam toward said off-axis concave mirror; and an optical element in the light path having at least one spherical optical surface, whereby said optical element corrects the path of said deflected light beam such that said light beam scans a target plane with a substantially flat field of focus.

5. The system of claim 4 wherein the respective positions and orientations of said planar reflector, said concave mirror and said optical element are selected so as to provide a substantially straight line scan of said light beam.

6. An optical scanning system comprising:

a planar reflector disposed in a path of a light beam and being movable about a scan axis;

a single concave mirror fixed in said light path and having a spherical reflective surface; and a single converging lens disposed in said light path having a pair of spherical optical surfaces, said spherical surfaces of said concave mirror and said lens having centers of curvature which are collinear with a symmetry axis through a point of incidence of the chief ray of said light beam on said planar reflector, the respective radii of curvature of said spherical surfaces and the positions of said concave mirror and said lens along said light path being selected so as to provide a straight line, flat image field, telecentric scan of said light beam on a target surface.

7. The system of claim 6 wherein said lens is positioned between said planar reflector and said concave mirror.

8. The system of claim 6 wherein said lens is positioned in series after said concave mirror.

9. The system of claim 6 wherein said lens is positioned to intercept said light path both before said light beam reaches said concave mirror and after said light beam has been reflected by said concave mirror.

10. The system of claim 9 wherein said lens and concave mirror are integrally formed, said lens having a reflective mirror coating on a rear surface to form said concave mirror.

11. The system of claim 9 wherein said lens is spaced apart from said concave mirror.

12. The system of claim 6 wherein said lens and said concave mirror are positioned off of said symmetry axis, said planar mirror being tilted with respect to said incident light beam so as to deflect said light beam toward said off-axis concave mirror.

13. The system of claim 6 wherein said position of said lens with respect to said concave mirror and said radii of curvature of said lens for said position are selected to minimize at least one of coma and astigmatism.

* * * * *